July 19, 1949.  H. S. BISHOP  2,476,651
DUAL OR MULTIPLE ACTING HYDRAULIC BOOSTER
Filed May 7, 1947
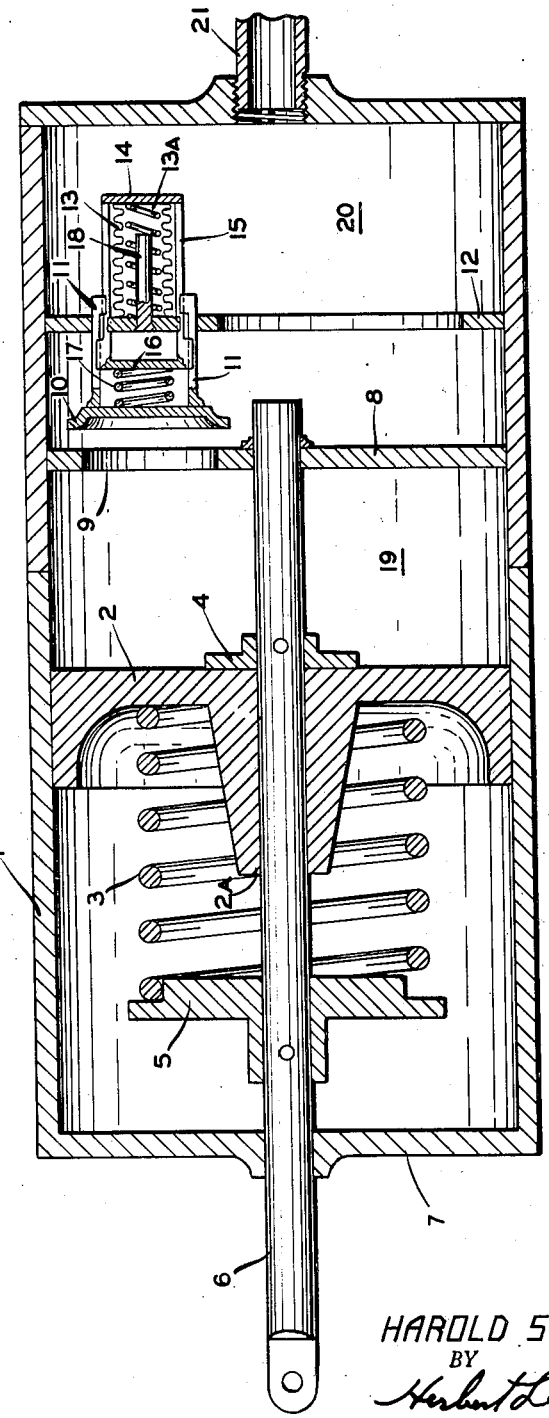
INVENTOR.
HAROLD STEVEN BISHOP
BY
*Herbert L. Davis, Jr.*
-ATTORNEY- Patented July 19, 1949

2,476,651

UNITED STATES PATENT OFFICE 2,476,651

DUAL OR MULTIPLE ACTING HYDRAULIC BOOSTER

Harold Steven Bishop, Scotch Plains, N. J., assignor to Bendix Aviation Corporation, Teterboro, N. J., a corporation of Delaware Application May 7, 1947, Serial No. 746,435

1 Claim. (Cl. 60—54.6)

This invention relates to a hydraulic booster and more particularly to a booster or master cylinder adapted to hydraulically actuate the brakes of an automobile or other device, such as, for example, a punch press.

An object of the invention is to provide means for quickly filling all lines in a hydraulic system prior to exerting the actuating force of a high advantage ram or piston to a device operated thereby.

Another object of the invention is to provide means for effecting in a hydraulic booster a powerful force application to the output of the booster for a given input stroke and a positive action upon failure of the higher force means.

Another object of the invention is to provide a novel piston and valve arrangement for hydraulic actuation in which the piston is spring loaded and the valve is operated by a bellows affected by the back pressure from the device to be actuated at the time all slack in the lines has been taken up.

Another object of the invention is to so arrange the piston as to bottom against a stop so that force may be applied directly to the piston to bias the valve open for direct hydraulic actuation in the event of loss of liquid in the high pressure chamber.

These and other objects and features of the invention are pointed out in the following description in terms of the embodiment thereof which is shown in the accompanying drawing. It is to be understood, however, that the drawing is for the purpose of illustration only, and is not designed as a definition of the limits of the invention, reference being had to the appended claim for this purpose.

The drawing is a sectional view of a multiple acting hydraulic booster or master cylinder embodying the present invention.

Referring to the drawing, there is indicated by the numeral 1 a casing in which is slidably mounted a piston 2 biased under force of a spring 3 into engaging relation with a stop 4.

The spring 3 is engaged at one end by the piston 2 while the opposite end is held by a second stop or spring backing member 5. The stop 4 and backing member 5 are connected to piston rod 6. The piston rod 6 is slidably mounted at one end in an end plate 7 while the opposite end thereof is carried by a plate 8 mounted in casing 1.

The spring 3 biases the piston 2 against its stop 4 so that the rod 6 and piston 2 move together. The piston 2 has a collar 2A adapted to engage the stop 5 so as to effect a direct connection between the rod 6 and piston 2.

The member 8 has formed therein a valve opening 9 which is controlled by a valve plate 10. The valve plate 10 is carried by arms 11 which are slidably mounted in a plate member 12 mounted in the casing 1. A bellows 13 which may be either evacuated or contain some gas has one end mounted on the member 12, while the opposite end engages a plate 14 to which are connected the arms 15 slidably mounted on the arms 11. The free ends of arms 11 and 15 engage one with the other. A spring 13A effects expansion of the bellows 13.

The arms 15 are in turn connected to a plate 16 which engages one end of a spring 17. The opposite end of the spring 17 acts against the valve plate 10 so as to tend to bias the same to a closed position upon the bellows 13 collapsing under force of fluid pressure as will be explained. A pin 18 projects from the member 12 into the bellows 13 and limits the movement of the bellows 13 and the consequent maximum bias on spring 17.

It will be seen from the foregoing that the member 8 separates the interior of the casing 1 into a chamber 19 in which the piston 2 moves and a chamber 20 in which the bellows 13 is positioned and in which a high pressure may be developed. The valve opening 9 controlled by the valve plate 10 connects the chamber 19 with the chamber 20. A conduit 21 connects the chamber 20 with the device to be actuated by liquid pressure under displacement force of the piston 2 and actuating force of the surface area of the end of rod 6.

Operation

Starting with the unloaded position shown, force may be applied at the rod 6 so as to force the piston 2 through spring 3 against the pressure of liquid in the chambers 19 and 20. During the major displacement operation, the spring 3 holds the piston 2 against its stop 4 so that the rod 6 and piston 2 then move together. This action forces the liquid from chamber 19 into chamber 20 and through the outlet conduit 21 to the device being actuated, which device may be of the well known expansible chamber type. During this period, the liquid flows through valve port 9 from chamber 19 to chamber 20, since the control valve 10 is held open by action of the expanded bellows 13.

When line 21 fills, the back pressure compresses bellows 13 and hence increases the tension exerted by spring 17 so as to bias the valve plate 10 to close valve port 9. The rod 6, in moving further into chamber 20, then builds up a high pressure in the chamber 20 and in discharge line 21 to the device being operated. Since the valve 10 is now closed, the stop 4 moves away from the piston 2 against the tension of spring 3 upon the further movement of the rod 6 into chamber 20.

Normally, the collar 2A of piston 2 does not bottom against the stop or spring backing member 5 affixed to rod 6. However, if a further application of force is applied to the rod 6, the same will cause the collar 2A of piston 2 to bottom against the spring backing member 5 so that the piston 2 thus directly connected to rod 6 will then force further liquid from the chamber 19 through valve port 9 and into chamber 20 and thereby into outlet conduit 21. Thus there is provided a direct hydraulic connection between the rod 6 and the line 21.

It will be seen from the foregoing that I have provided a novel dual or multiple acting hydraulic booster or master cylinder.

Although only one embodiment of the invention has been illustrated and described, various changes in the form and relative arrangements of the parts, which will now appear to those skilled in the art, may be made without departing from the scope of the invention. Reference is, therefore, to be had to the appended claim for a definition of the limits of the invention.

What is claimed is:

A device of the character described, comprising, in combination, a cylinder having a liquid supply chamber and a liquid pressure chamber formed therein, a liquid conduit opening from said pressure chamber to a device to be hydraulically actuated, a valve to control flow of liquid from the supply chamber to the pressure chamber, a piston movable in said supply chamber for causing displacement of liquid to said pressure chamber, an actuating rod slidably mounted in said supply chamber and extending into said pressure chamber, said piston slidably mounted on said rod, a helical spring mounted on said rod, a pair of stop members affixed to said rod, one end of said spring supported by one of said stop members and the other end of said spring biasing said piston into engagement with the other stop member, a spring biased bellows operably connected to said valve, said bellows mounted within said pressure chamber and arranged to open and close said valve in response to changes in the liquid pressure in said pressure chamber, said spring permitting movement of said piston on said rod upon the valve closing so as to permit further movement of said rod into said pressure chamber, and said one stop member limiting the movement of said piston on said rod so as to permit a direct application of force from said rod to said piston.

HAROLD STEVEN BISHOP.

REFERENCES CITED

The following references are of record in the file of this patent:

UNITED STATES PATENTS

| Number | Name | Date |
|---|---|---|
| 2,009,105 | Carroll | July 23, 1935 |
| 2,340,113 | Dodge | Jan. 25, 1944 |
| 2,341,318 | Forbes | Feb. 8, 1944 |